United States Patent
Gauthier et al.

(10) Patent No.: US 11,297,062 B2
(45) Date of Patent: Apr. 5, 2022

(54) AUTHORIZED TIME LAPSE VIEW OF SYSTEM AND CREDENTIAL DATA

(71) Applicant: Carrier Corporation, Farmington, CT (US)

(72) Inventors: Ed Gauthier, Fairport, NY (US); Ben Holm, Farmington, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 83 days.

(21) Appl. No.: 15/999,083

(22) PCT Filed: Feb. 7, 2017

(86) PCT No.: PCT/US2017/016809
§ 371 (c)(1),
(2) Date: Aug. 17, 2018

(87) PCT Pub. No.: WO2017/142742
PCT Pub. Date: Aug. 24, 2017

(65) Prior Publication Data
US 2019/0173887 A1 Jun. 6, 2019

Related U.S. Application Data

(60) Provisional application No. 62/296,281, filed on Feb. 17, 2016.

(51) Int. Cl.
*H04L 29/06* (2006.01)
*G06F 21/45* (2013.01)
(Continued)

(52) U.S. Cl.
CPC ............ *H04L 63/102* (2013.01); *G06F 21/30* (2013.01); *G06F 21/45* (2013.01); *H04L 63/068* (2013.01);
(Continued)

(58) Field of Classification Search
None
See application file for complete search history.

(56) References Cited

U.S. PATENT DOCUMENTS 7,278,111 B2  10/2007  Stata et al.
7,496,857 B2   2/2009  Stata et al.
(Continued)

FOREIGN PATENT DOCUMENTS

CN          104809597 A      7/2015

OTHER PUBLICATIONS

International Application No. PCT/US2017/016809 International Search Report and Written Opinion dated Apr. 20, 2017, 13 pages.
(Continued)

*Primary Examiner* — Piotr Poltorak
(74) *Attorney, Agent, or Firm* — Cantor Colburn LLP

(57) ABSTRACT

A system includes a configuration management server operable to interface with a plurality of client devices via a network. The configuration management server includes a processor that is configured to track a change history of modifications to one or more records of a plurality of system data and credential data. An authorization status of a user of an access client of one of the client devices is determined. An authorized view of a selected record of the one or more records is output to the access client. One or more fields of the selected record are displayed based on the authorization status. An output of the change history of modifications to the one or more fields of the selected record to the access client is limited based on the authorization status.

8 Claims, 4 Drawing Sheets

(51) Int. Cl.
*G06F 21/30* (2013.01)
*H04W 12/06* (2021.01)
*H04W 12/08* (2021.01)
*G06F 9/451* (2018.01)

(52) U.S. Cl.
CPC ....... *H04L 63/0846* (2013.01); *H04W 12/068* (2021.01); *H04W 12/08* (2013.01); *G06F 9/451* (2018.02)

(56) References Cited

U.S. PATENT DOCUMENTS

| | | | |
|---|---|---|---|
| 7,523,417 B2 | 4/2009 | Hintermeister et al. | |
| 7,716,194 B2 | 5/2010 | Williams et al. | |
| 8,010,903 B2 | 8/2011 | Dieberger et al. | |
| 8,135,696 B2 | 3/2012 | Safoutin | |
| 8,261,202 B2 | 9/2012 | Dunn | |
| 8,332,767 B1 | 12/2012 | Beil et al. | |
| 8,356,248 B1 | 1/2013 | Killalea | |
| 8,949,782 B2 | 2/2015 | Hamlin et al. | |
| 8,990,716 B2 | 3/2015 | Nakamura et al. | |
| 9,026,598 B2* | 5/2015 | Kumar | G06Q 10/107 709/206 |
| 9,122,375 B2 | 9/2015 | Gardenfors | |
| 9,135,312 B2 | 9/2015 | Greenspan et al. | |
| 9,195,750 B2 | 11/2015 | Hayden | |
| 9,557,932 B1* | 1/2017 | Chopra | G06F 3/065 |
| 10,084,794 B2* | 9/2018 | Goldfarb | G06F 21/305 |
| 10,282,557 B1* | 5/2019 | Pore | G06F 21/6209 |
| 2002/0063737 A1* | 5/2002 | Feig | G06F 3/04847 715/786 |
| 2003/0009493 A1 | 1/2003 | Parker et al. | |
| 2003/0187848 A1* | 10/2003 | Ghukasyan | G06F 16/24547 |
| 2004/0015503 A1* | 1/2004 | Smith | G06F 16/289 |
| 2004/0068690 A1* | 4/2004 | Wood | G06Q 50/24 715/205 |
| 2004/0193953 A1* | 9/2004 | Callahan | G06F 11/1451 714/15 |
| 2005/0071392 A1* | 3/2005 | Sandorfi | G06F 11/1448 |
| 2005/0114523 A1* | 5/2005 | Barron | H04L 63/10 709/228 |
| 2005/0171872 A1* | 8/2005 | Burch | H04L 67/10 705/29 |
| 2005/0246762 A1* | 11/2005 | Girouard | H04L 63/104 726/2 |
| 2007/0033654 A1* | 2/2007 | Wilson | G06F 21/604 726/27 |
| 2008/0104046 A1 | 5/2008 | Singla et al. | |
| 2008/0109883 A1* | 5/2008 | Hernoud | G06F 21/6218 726/5 |
| 2008/0294663 A1 | 11/2008 | Heinley et al. | |
| 2008/0307345 A1* | 12/2008 | Hart | G06F 11/1469 715/769 |
| 2009/0049108 A1 | 2/2009 | Forde et al. | |
| 2009/0063509 A1* | 3/2009 | Lockhart | H04L 43/0876 |
| 2010/0005259 A1* | 1/2010 | Prahlad | G06F 11/1471 711/162 |
| 2010/0057788 A1* | 3/2010 | Harm | G06F 11/1448 707/E17.007 |
| 2010/0070888 A1 | 3/2010 | Watabe et al. | |
| 2010/0138735 A1 | 6/2010 | Uematsu | |
| 2010/0306171 A1* | 12/2010 | Antos | G06F 11/1448 707/638 |
| 2010/0312754 A1* | 12/2010 | Bear | G06F 16/134 707/685 |
| 2011/0016521 A1 | 1/2011 | Kigo | |
| 2011/0083088 A1* | 4/2011 | Cisler | G06F 9/451 715/763 |
| 2011/0197121 A1* | 8/2011 | Kletter | G06F 40/166 715/234 |
| 2011/0202505 A1* | 8/2011 | Sugahara | G06F 11/1456 707/654 |
| 2012/0042269 A1 | 2/2012 | Holman | |
| 2012/0218075 A1* | 8/2012 | Hill | G07C 9/27 340/5.61 |
| 2012/0331378 A1 | 12/2012 | Baioura | |
| 2013/0085944 A1* | 4/2013 | Fielder | G06Q 20/401 705/67 |
| 2013/0086501 A1 | 4/2013 | Chow et al. | |
| 2013/0145327 A1 | 6/2013 | Rinearson et al. | |
| 2014/0040314 A1* | 2/2014 | Ebrahimi | G06F 16/25 707/783 |
| 2014/0114709 A1* | 4/2014 | Olsen | G06Q 10/0631 705/7.12 |
| 2014/0201153 A1* | 7/2014 | Vijayan | G06F 11/1451 707/647 |
| 2014/0244565 A1* | 8/2014 | de Koning | G06F 19/3418 706/50 |
| 2015/0169654 A1 | 6/2015 | Chen et al. | |
| 2015/0170403 A1 | 6/2015 | Barcay et al. | |
| 2015/0178972 A1 | 6/2015 | Barcay et al. | |
| 2015/0207705 A1* | 7/2015 | Piercey | H04L 63/102 709/223 |
| 2015/0254453 A1 | 9/2015 | Sugiyama | |
| 2015/0379294 A1* | 12/2015 | Cohen | H04L 65/403 726/28 |
| 2018/0359811 A1* | 12/2018 | Verzun | H04L 12/28 |

OTHER PUBLICATIONS

CN Application No. 201780012090.8 Translated First Office Action dated Apr. 6, 2021, 17 pages.

* cited by examiner

AUTHORIZED TIME LAPSE VIEW OF SYSTEM AND CREDENTIAL DATA

CROSS REFERENCE TO RELATED APPLICATIONS

This is a U.S. National Stage filing of Application No. PCT/US2017/016809, filed on Feb. 7, 2017, which claims the benefit of U.S. Provisional Patent Application No. 62/296,281, filed on Feb. 17, 2016, the disclosures of which are incorporated herein by reference.

DESCRIPTION OF RELATED ART

The subject matter disclosed herein relates to system configuration management, and more particularly to creating an authorized time lapse view of system and credential data.

Typically, security management systems track the present authorization of individuals to gain access to physical entry points and/or electronic systems. Security management systems can define credentials for individual users and groups of users to control access to physical locations and/or electronic data. However, such security management systems may be vulnerable to a rogue or unauthorized user changing access privileges without a means of detection. Further, in systems that track change history of security or credential data, the change history may be captured in a format that makes it difficult to determine how changes occurred over time and may provide users with change history of sensitive data that they would not otherwise be able to access.

BRIEF SUMMARY

According to an embodiment, a system includes a configuration management server operable to interface with a plurality of client devices via a network. The configuration management server includes a processor that is configured to track a change history of modifications to one or more records of a plurality of system data and credential data. An authorization status of a user of an access client of one of the client devices is determined. An authorized view of a selected record of the one or more records is output to the access client. One or more fields of the selected record are displayed based on the authorization status. An output of the change history of modifications to the one or more fields of the selected record to the access client is limited based on the authorization status.

In addition to one or more of the features described above, or as an alternative to any of the foregoing embodiments, further embodiments could include where a timeline control provides a user interface to select from one or more points in time when modifications to the one or more fields were made.

In addition to one or more of the features described above, or as an alternative to any of the foregoing embodiments, further embodiments could include where the change history of modifications include the one or more points in time when modifications to the one or more fields were made, previous values of the one or more fields, and a modification user identifier that identifies a user who made the modifications to the one or more fields.

In addition to one or more of the features described above, or as an alternative to any of the foregoing embodiments, further embodiments could include where the change history of modifications is output on a user interface that displays one or more unmodified fields of the selected record in combination with the modifications to the one or more fields of the selected record.

In addition to one or more of the features described above, or as an alternative to any of the foregoing embodiments, further embodiments could include where visual cues of the change history of modifications to the one or more fields are output to the access client to highlight or flag changes.

In addition to one or more of the features described above, or as an alternative to any of the foregoing embodiments, further embodiments could include where a current instance of the selected record is restored to a previous version of the selected record from the change history of modifications to the one or more fields of the selected record based on receiving a restore request.

In addition to one or more of the features described above, or as an alternative to any of the foregoing embodiments, further embodiments could include where the system data includes configuration of one or more access control points of a secured environment, and the credential data includes user authorization data associated with the one or more access control points.

In addition to one or more of the features described above, or as an alternative to any of the foregoing embodiments, further embodiments could include where the change history of modifications to the one or more fields of the selected record is output as changes with respect to current values of the one or more fields or as incremental changes between sequential points in time.

According to an embodiment, a method includes tracking a change history of modifications to one or more records of a plurality of system data and credential data. An authorization status of a user of an access client is determined. An authorized view of a selected record of the one or more records is output to the access client, where one or more fields of the selected record are displayed based on the authorization status. An output of the change history of modifications to the one or more fields of the selected record to the access client is limited based on the authorization status.

Technical function of the embodiments described above includes providing an authorized time lapse view of system and/or credential data.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
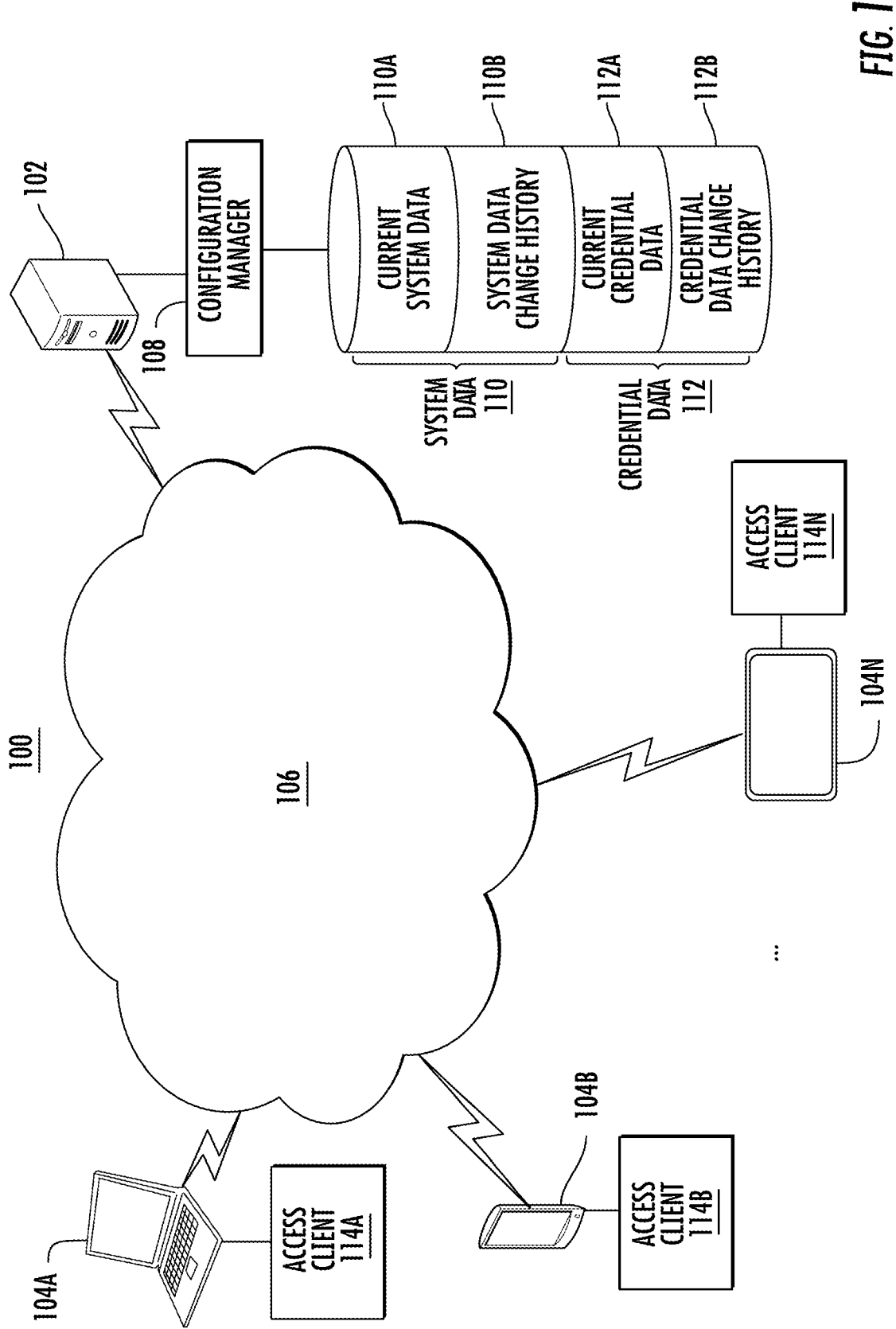
FIG. 1 illustrates a schematic view of a system according to an embodiment.

Referring now to the drawings, FIG. 1 illustrates a schematic view of a system 100 according to an embodiment that can be implemented to configure access control points (e.g., physical security and/or data security) and user authorization in a secured environment. In the example depicted in FIG. 1, the system 100 includes a configuration management server 102 operable to interface with a plurality of client devices 104A-104N via a network 106. The network 106 may be any type of communications network known in the art and can include a combination of wireless, wired, and/or fiber optic links. Although only a single configuration management server 102 and three client devices 104A-N are depicted in FIG. 1, it will be understood that there can be any number of configuration management servers 102 and client devices 104A-N that can interface with each other and various networked components across the network 106. Further, one or more of the client devices 104A-N may also be the configuration management server 102.

In exemplary embodiments, the configuration management server 102 and/or client devices 104A-N can include a variety of processing devices with processing circuits and I/O interfaces, such as a keys/buttons, a touchscreen, audio input, a display device and audio output. The configuration management server 102 and client devices 104A-N may be embodied in any type of computer device known in the art, such as a laptop, tablet computer, mobile device, personal computer, workstation, server, and the like. Accordingly, the configuration management server 102 and client devices 104A-N can include various computer/communication hardware and software technology known in the art, such as one or more processors, volatile and non-volatile memory including removable media, power supplies, network interfaces, support circuitry, operating systems, and the like.

The configuration management server 102 can include a configuration manager 108 that controls access to system data 110 and credential data 112 that may be stored in one or more files or databases. In an embodiment, the system data 110 can store configuration data for one or more access control points of a secured environment. For example, the system data 110 may establish a configuration of one or more security card (e.g., badge) readers, alarm systems, electronic locks, video surveillance systems, and the like as security data. The system data 110 can alternatively or additionally include personal information, non-security related data, location information, asset identifiers, various configuration parameters, and the like. The credential data 112 can include user authorization data associated with the one or more access control points. For example, each user that is issued an identification card or badge may be given access to select physical entry points, access to data servers, and the ability to read and/or modify settings in the system data 110 and/or the credential data 112.

In embodiments, the system data 110 includes current system data 110A and system data change history 110B. Similarly, the credential data 112 can include current credential data 112A and credential data change history 112B. The current system configuration is defined by the current system data 110A and the current credential data 112A. When one or more records of the current system data 110A are modified, a change history of modifications can be captured in the system data change history 110B. Similarly, when one or more records of the current credential data 112A are modified, a change history of modifications can be captured in the credential data change history 112B. The change history of modifications in the system data change history 110B and/or the credential data change history 112B can include, for instance, records of one or more points in time when modifications to one or more fields were made, previous values of the one or more fields, and a modification user identifier that identifies a user who made the modifications to the one or more fields.

In an alternate embodiment, change history is stored as a snapshot of data values at a point in time when the data values are saved. Using snapshots, a change history of modifications to one or more fields of a selected record can be determined by comparing records captured at different points in time, such as comparing a current record to a previous record. For example, when an update of the current system data 110A is requested, a snapshot of the current system data 110A can be copied into the system data change history 110B before changes are committed to the current system data 110A to populate a history for comparisons. Similarly, when an update of the current credential data 112A is requested, a snapshot of the current credential data 112A can be copied into the credential data change history 112B before changes are committed to the current credential data 112A.

Users of client devices 104A-N can use respective instances of access clients 114A-N to interface with the configuration manager 108 to view and/or modify the system data 110 and/or credential data 112. Users of access clients 114A-114N can each have a different authorization status that defines whether specific records or fields are available for viewing and/or editing. For instance, client device 104A may be a security desk laptop or PC, where a security guard uses access client 114A to grant temporary facility access to a visitor or contractor. Client device 104B may be a mobile computing device, where a maintenance worker uses access client 114B to install or reconfigure a physical access control point. Client device 104N may be a tablet computer, where a security manager uses access client 114N to audit the system data 110 and the credential data 112.

Figure 2:
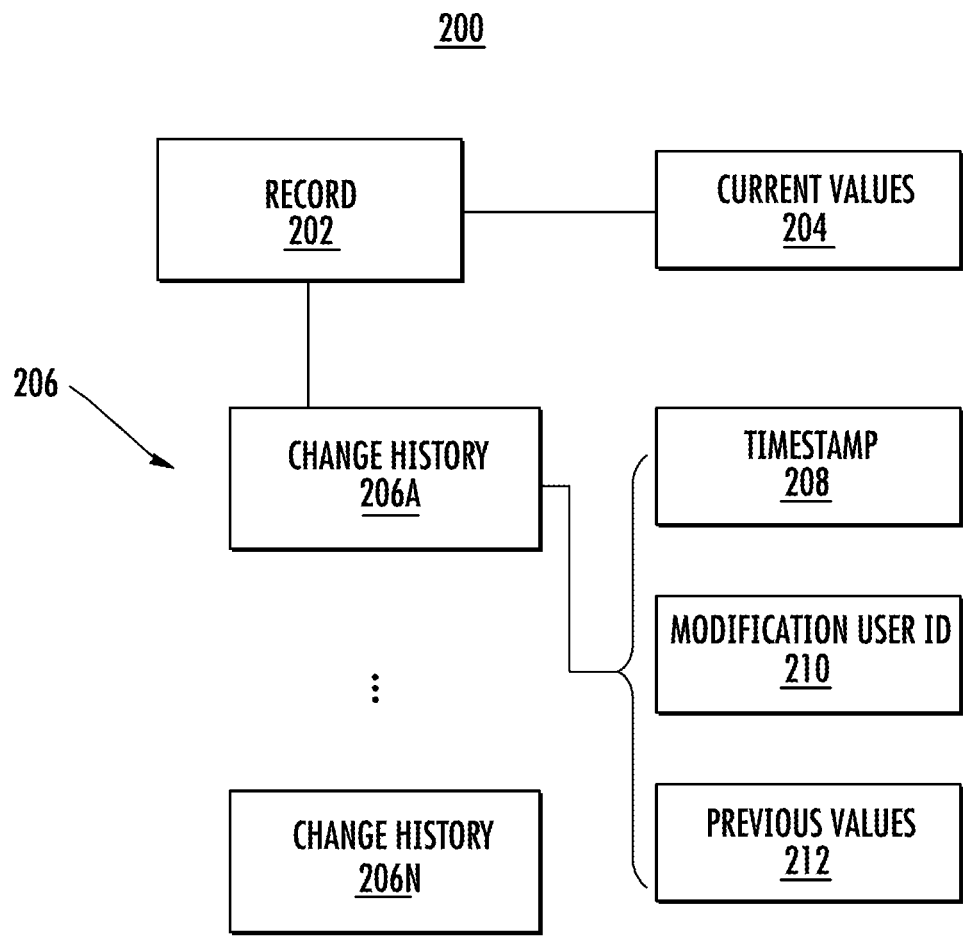
FIG. 2 illustrates a schematic view of a change history structure according to an embodiment.

FIG. 2 illustrates a schematic view of a change history structure 200 according to an embodiment. The change history structure 200 illustrates a simplified example of a record 202 that may be incorporated in the current system data 110A or the current credential data 112A of FIG. 1. The record 202 includes current values 204 of one or more fields. As changes are made to the record 202, a change history 206 is created as a sequential list of change history records 206A-206N. Each of the change history records 206A-206N can include a corresponding timestamp 208 indicating when the change was made, a modification user identifier 210 indicating who made the change, and one or more previous values 212 of one or more fields that were updated. For example, if the record 202 is a record within current system data 110A, as the current values 204 are modified, the change history 206 is captured in the system data change history 110B such that the change date/time, change originator, and previous values are stored for auditing and/or restoration. Similarly, if the record 202 is a record within current credential data 112A, as the current values 204 are modified, the change history 206 is captured in the credential data change history 112B. In an alternate embodiment, each record 202 is a snapshot of the current values 204, a timestamp 208 indicating when the record 202 was saved, and a modification user identifier 210 indicating who saved the record 202, where the record 202 can be stored in the current system data 110A or current credential data 112A as the most recently saved data and/or in the system data change history 110B or credential data change history 112B for older data.

Figure 3:
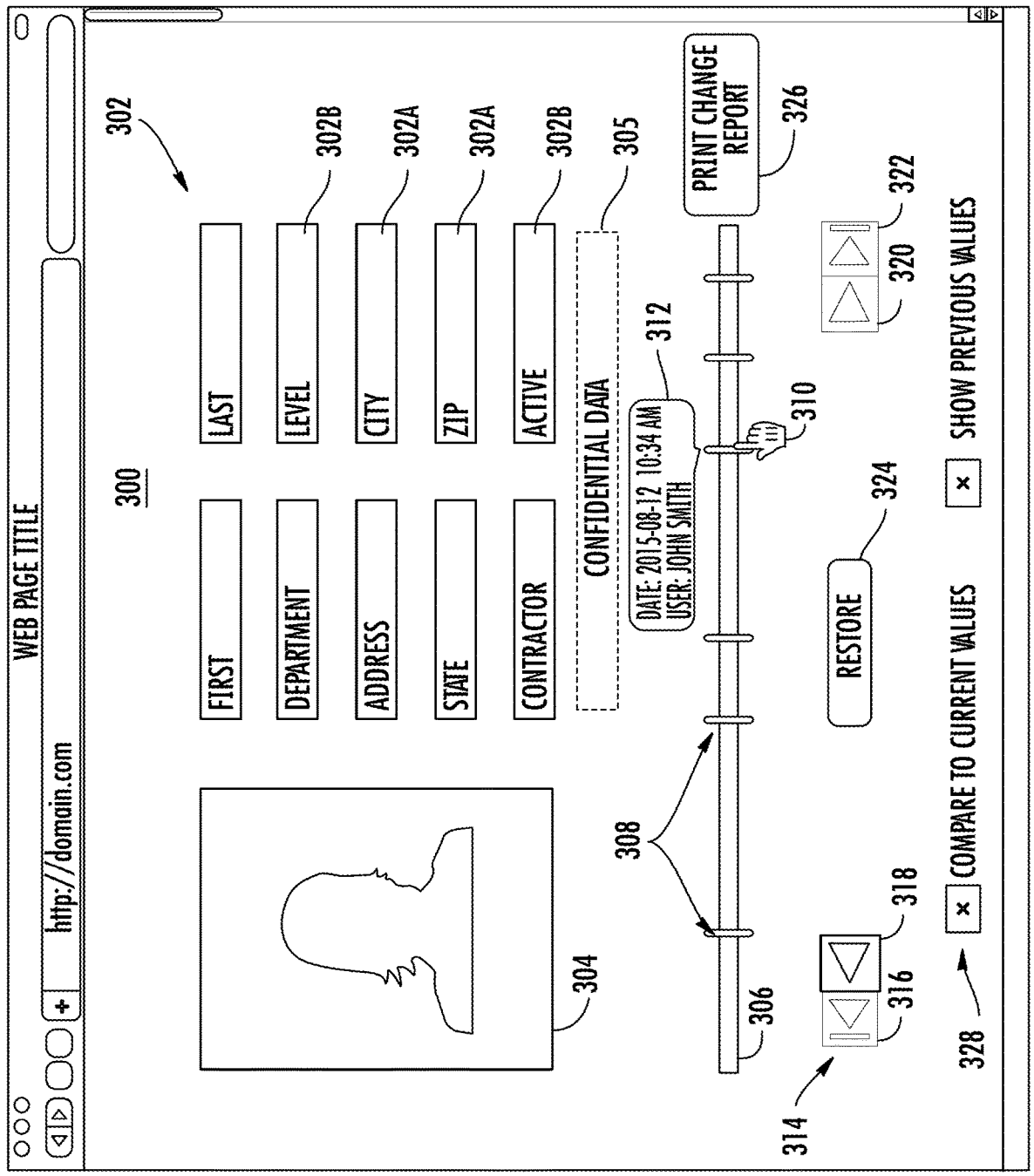
FIG. 3 illustrates a block diagram of a user interface according to an embodiment.

FIG. 3 illustrates a block diagram of a user interface 300 according to an embodiment. The user interface 300 is an example that may be interactively displayed by one of the access clients 114A-N of FIG. 1. In the example of FIG. 3, the user interface 300 displays a plurality of fields 302 for a selected record, e.g., record 202 of FIG. 2. The fields 302 and associated data values can be output by the configuration manager 108 of FIG. 1. In FIG. 3, the fields 302 are from a selected record of the credential data 112 of FIG. 1; however, it will be understood that a similar user interface can be used for the system data 110 of FIG. 1. The user interface 300 may also include supplemental data 304, such as an image, a hyperlink, or other such data. A timeline control 306 on the user interface 300 allows a user to select from one or more points in time 308 when modifications to the values of one or more fields 302 were made.

A selection pointer 310 or other means can be used to highlight or select a point in time 308 to observe historical changes. Visual cues of the change history of modifications to one or more fields 302 can be output to the access client 114A-N to highlight or flag changes. For example, when selecting a point in time 308, the user interface 300 can display one or more unmodified fields 302A of the selected record in combination with the modifications to the one or more fields 302B of the selected record. Modifications can be summarized using pop-up/tooltip information bubbles 312. In some embodiments, a history of each field 302 may be viewed by moving the selection pointer 310 over the field 302.

A navigation control 314 may be used to incrementally step or jump between points in time 308 on the timeline control 306. For instance, button 316 can jump to an oldest point in time, button 318 can step sequentially through earlier points in time, button 320 can step sequentially through later points in time, and button 322 can jump to the most recent/current point in time. Other methods of navigating or stepping between points in time 308 are also contemplated. As a user navigates through points in time 308, hidden information, such as confidential data 305 that was inaccessible due to a user's authorization status remains hidden even though the confidential data 305 may be associated with the selected record. The navigation control 314 can also include a restore command 324 to trigger restoration of a current instance of the selected record from a previous version of the selected record from the change history of modifications. A print change report command 326 may be provided to generate a report of changes on a field basis, record basis, user basis, or other basis.

The user interface 300 can further include other user selectable options 328 that modify how data changes are compared and displayed. For instance, the change history of modifications to the one or more fields 302 of the selected record can be output as changes with respect to current values of the one or more fields 302 or as incremental changes between sequential points in time 308. Further, the actual previous values may be suppressed when a history of change actions rather than data values is desired. Further options may also or alternatively be included in embodiments.

Figure 4:
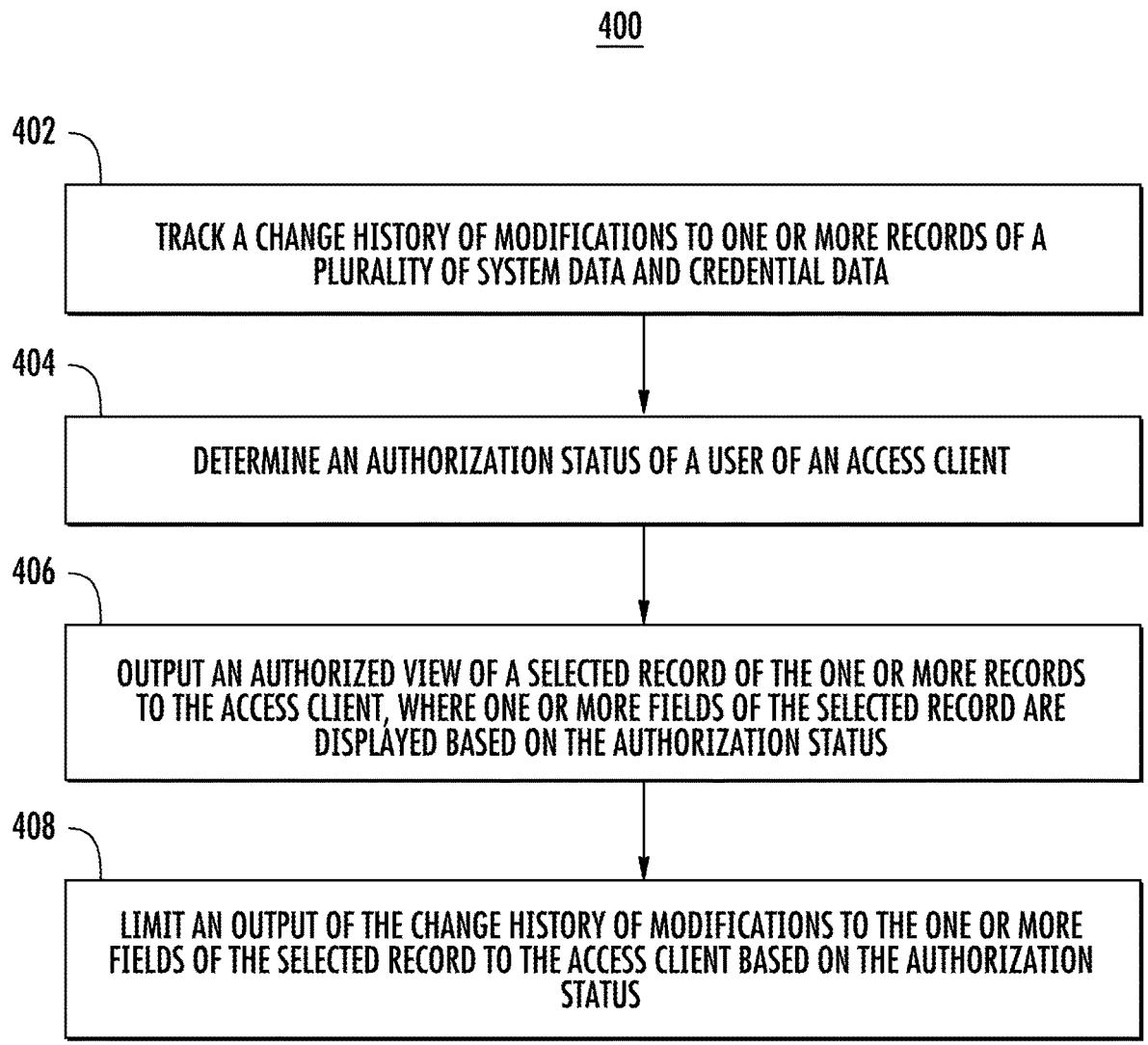
FIG. 4 is a flow diagram of a method according to an embodiment.

FIG. 4 illustrates a method 400 of using a fallback mobile proxy according to embodiments. The method 400 can be performed by various elements of FIGS. 1-3 and is described in reference to FIGS. 1-3. At block 402, the configuration manager 108 tracks a change history of modifications to one or more records of a plurality of system data 110 and credential data 112. At block 404, the configuration manager 108 determines an authorization status of a user of an access client 114A-N, e.g., based on group membership, department, or other authorization control. At block 406, the configuration manager 108 outputs an authorized view of a selected record of the one or more records to the access client 114A-N, where one or more fields of the selected record are displayed based on the authorization status. At block 408, the configuration manager 108 limits an output of the change history of modifications to the one or more fields of the selected record to the access client based on the authorization status.

As previously described, the configuration manager 108 can provide a timeline control 306 to a user interface 300 to select from one or more points in time 308 when modifications to the one or more fields were made. The change history of modifications can include one or more points in time when modifications to the one or more fields were made, previous values of the one or more fields, and a modification user identifier that identifies a user who made the modifications to the one or more fields. The change history of modifications can be output on a user interface 300 that displays one or more unmodified fields of the selected record in combination with the modifications to the one or more fields of the selected record. The change history of modifications to the one or more fields of the selected record may be output as changes with respect to current values of the one or more fields or as incremental changes between sequential points in time. Visual cues of the change history of modifications to the one or more fields can be output to the access client to highlight or flag changes. A current instance of the selected record can be restored to a previous version of the selected record from the change history of modifications to the one or more fields of the selected record based on receiving a restore request.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A system for configuring access control points and user authorization, the system comprising:
   a configuration management server operable to interface with a plurality of client devices via a network, the configuration management server comprising a processor and memory that is configured to perform:
   controlling access to a plurality of system data and credential data by a configuration manager executing on the configuration management server;
   tracking, by the configuration manager, a change history of modifications to one or more records of the system data and credential data stored in one or more files or databases, wherein the system data comprises configuration of one or more access control points of a secured environment, and the credential data comprises user authorization data associated with the one or more access control points that control user access to one or more physical entry points of the secured environment;
   determining, by the configuration manager, an authorization status of a user of an access client of one of the client devices;

outputting, by the configuration manager, an authorized view of a selected record of the one or more records to a user interface of the access client, wherein one or more fields of the selected record are displayed based on the authorization status and the user interface allows editing of the one or more fields based on the authorization status;

limiting, by the configuration manager, an output of the change history of modifications to the one or more fields of the selected record to the access client based on the authorization status; and outputting, to the user interface, the change history of modifications to display one or more unmodified fields of the selected record in combination with the modifications to the one or more fields of the selected record, wherein the user interface comprises a timeline control to select from one or more points in time when modifications to the one or more fields were made, and the change history of modifications comprises: the one or more points in time when modifications to the one or more fields were made, previous values of the one or more fields, and a modification user identifier that identifies a user who made the modifications to the one or more fields.

2. The system of claim 1, wherein visual cues of the change history of modifications to the one or more fields are output to the access client to highlight or flag changes.

3. The system of claim 1, wherein a current instance of the selected record is restored to a previous version of the selected record from the change history of modifications to the one or more fields of the selected record based on receiving a restore request.

4. The system of claim 1, wherein the change history of modifications to the one or more fields of the selected record is output as changes with respect to current values of the one or more fields or as incremental changes between sequential points in time based on a selection received through the user interface of the access client.

5. A method of configuring access control points and user authorization, the method comprising:

controlling access to a plurality of system data and credential data by a configuration manager executing on a configuration management server;

tracking, by the configuration manager, a change history of modifications to one or more records of the system data and credential data, wherein the system data comprises configuration of one or more access control points of a secured environment, and the credential data comprises user authorization data associated with the one or more access control points that control user access to one or more physical entry points of the secured environment;

determining, by the configuration manager, an authorization status of a user of an access client;

outputting, by the configuration manager, an authorized view of a selected record of the one or more records to a user interface of the access client, wherein one or more fields of the selected record are displayed based on the authorization status and the user interface allows editing of the one or more fields based on the authorization status;

limiting, by the configuration manager, an output of the change history of modifications to the one or more fields of the selected record to the access client based on the authorization status; and outputting, to the user interface, the change history of modifications to display one or more unmodified fields of the selected record in combination with the modifications to the one or more fields of the selected record, wherein the user interface comprises a timeline control to select from one or more points in time when modifications to the one or more fields were made, and the change history of modifications comprises: the one or more points in time when modifications to the one or more fields were made, previous values of the one or more fields, and a modification user identifier that identifies a user who made the modifications to the one or more fields.

6. The method of claim 5, wherein visual cues of the change history of modifications to the one or more fields are output to the access client to highlight or flag changes.

7. The method of claim 5, wherein a current instance of the selected record is restored to a previous version of the selected record from the change history of modifications to the one or more fields of the selected record based on receiving a restore request.

8. The method of claim 5, wherein the change history of modifications to the one or more fields of the selected record is output as changes with respect to current values of the one or more fields or as incremental changes between sequential points in time based on a selection received through the user interface of the access client.

* * * * *